July 4, 1961
J. T. DE CARLE
2,990,574
LENS MOLDING APPARATUS
Filed June 8, 1959
2 Sheets-Sheet 1
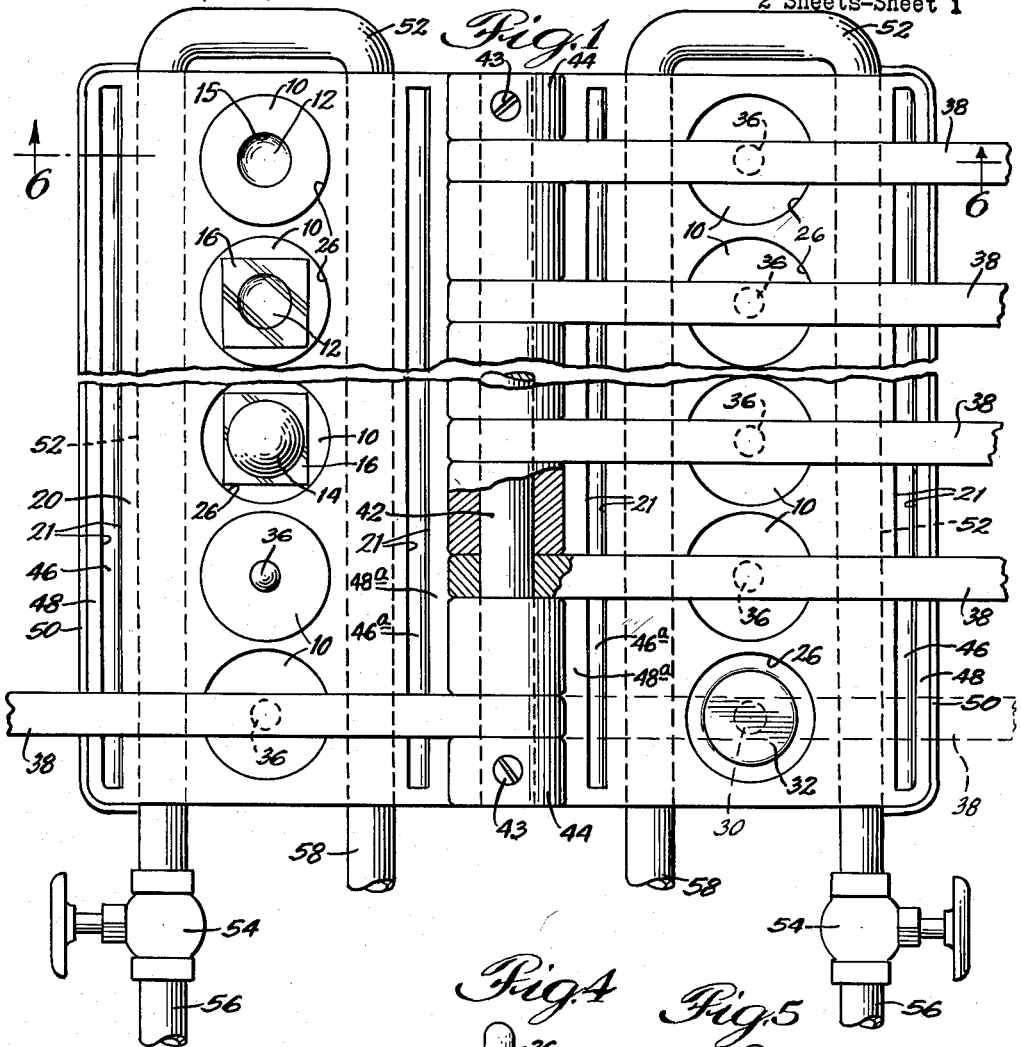
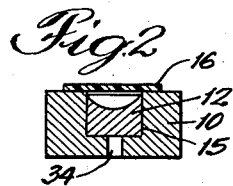
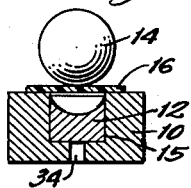
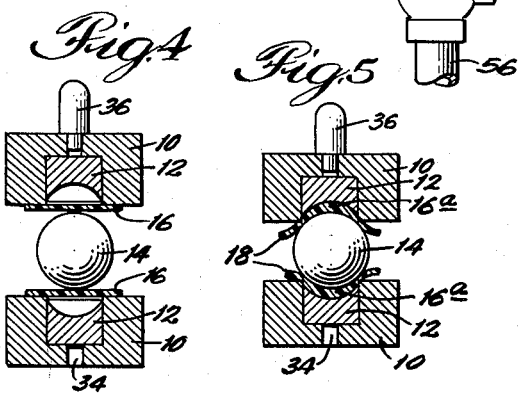
INVENTOR:
John T. de Carle,
BY Bair, Freeman & Molinare
ATTORNEYS.

July 4, 1961
J. T. DE CARLE
2,990,574
LENS MOLDING APPARATUS
Filed June 8, 1959
2 Sheets-Sheet 2
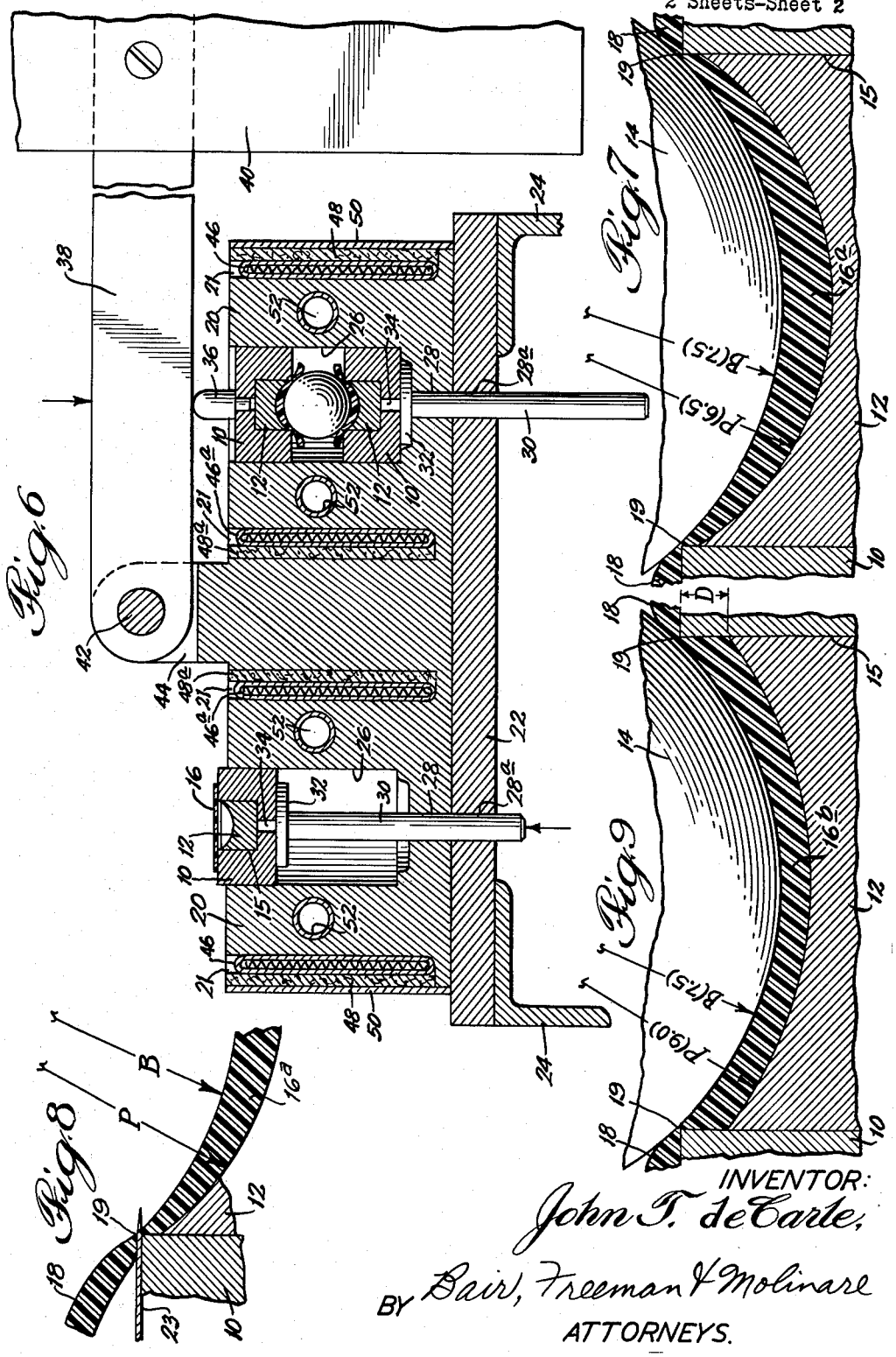
INVENTOR:
John T. de Carle,
BY Dair, Freeman & Molinare
ATTORNEYS.

United States Patent Office 2,990,574
Patented July 4, 1961

2,990,574
LENS MOLDING APPARATUS
John Trevor de Carle, Kingswood, England, assignor to Newton K. Wesley and George N. Jessen, Chicago, Ill.
Filed June 8, 1959, Ser. No. 818,911
10 Claims. (Cl. 18—5)

This invention is concerned with the production of contact lenses for correcting vision. Such lenses have been known for many years, and have for the most part been made to fit over substantially the whole of the visible surface of the eye (both cornea and sclera).

Optical lenses for use in precision instruments such as cameras, telescopes and the like have been produced by molding transparent plastic materials, but it has not hitherto proved practical to mold plastic materials such as methyl methacrylate in sheet form to make finished contact lenses. This is probably due to the varying curvatures which exist on the surface of the eye, each lens accordingly requiring a special mold, and to the difficulty of avoiding distortion due to strains produced in the lens during the molding and cooling thereof.

Such lenses, therefore, have up to now been made by grinding from a solid block of material which may have been roughly molded to shape by pressing a blank in a mold. These are very expensive operations which are mainly responsible for the present high cost of contact lenses.

In another method sometimes used, lenses are made by pressing a plastic material on to a plastic cast of the eye it is intended to fit, in order to shape the haptic portion, the optic portion being then ground and polished as in the previously described method. The cost of these so-called "molded" lenses is even higher than that of those mentioned above.

It has been found that it is necessary for a contact lens to cover only the cornea of the eye and a much smaller lens is therefore practical. This is possible because the light enters the eye only through the pupil, and this type of lens moves with the eye so that it is only necessary to make sure that there is no distortion due to strains or inequalities in that part of the lens which is in contact with the pupil. These smaller lenses, called "corneal" lenses which cover the cornea of the eye only have also been made hitherto by expensive processes involving initial turning to approximate shape in a lathe, then grinding to finished shape and finished by polishing, or by the method disclosed in my British Patent No. 731,155 of June 1, 1955.

I have now found that satisfactory corneal lenses can readily be molded from sheet plastic by means of highly polished molds, and such lenses are already "finished" without the necessity of any further polishing on their posterior and anterior surfaces but require only the rounding and polishing of their peripheral edges.

According to the present invention, my herein disclosed apparatus for the production of corneal contact lenses is operated for molding methyl methacrylate or similar blanks of sheet plastic under heat and pressure which results in a very big savings in production costs due to a reduction in the amount of material used for each lens, in the time for their manufacture and in the elimination of expensive turning, grinding and polishing operations.

The molds may be made of any material which will withstand the pressures and temperatures at which the material to be molded can be worked, and which is inert to the material under the conditions involved. I prefer to use molds in which the molding surfaces are made of highly polished metal or glass. In these molds the plastic material can be shaped to form lenses of the required characteristics.

My apparatus can also be used for bifocal corneal contact lenses such as those of the type illustrated in my copending application, Serial No. 697,277 filed November 18, 1957 and the copending applications of Wesley, Serial No. 718,851 filed March 3, 1958 and Black, Serial No. 765,553 filed October 6, 1958.

One object of the present invention is to provide comparatively simple and inexpensive apparatus for molding corneal contact lenses from sheets of plastic material which lenses have accurately spherical inner and outer finished surfaces accomplished by the use of molding elements of highly polished character, and which lenses can be readily trimmed at their edges as they are removed from the molds so that a lens molded in my apparatus then requires only rounding and smoothing of the peripheral edge thereof as by the method shown in the copending application of Cepero, Serial No. 758,177 filed September 2, 1958.

Another object is to provide male molding members which consist of interchangeable steel ball bearings, glass marbles, or the like which are initially formed accurately spherical and then highly polished, and to provide female mold members of cylindrical shape having spherical concavities which are highly polished and which are interchangeably usable in holders of the apparatus so that a few holders may produce many sizes of lenses by interchanging the male and female molding members as required.

Still another object is to provide a body member having bores for receiving the holders and the molds, which body member is provided with heating means for heating the holders and molds to the molding temperature of the plastic blanks, and are provided with cooling means, if desired, for quickly cooling the apparatus after the lenses have been molded thereby permitting the prompt removal of the molded lenses from the apparatus.

A further object is to provide a convenient means for applying pressure to the molds comprising weighted arms which are pivoted so that they can be swung into or out of operative position as required.

Still a further object is to provide the body member with a double row of bores for the molds and holders so that when the weighted arms are swung from operative position with respect to one of the rows, it will be swung to operative position with respect to the other row which has previously been loaded with holders, molds and plastic blanks. This arrangement results in the reduction of time required for loading, unloading and molding the lenses, and correspondingly increases the production rate.

With these and other objects in view, my invention consists in the construction, arrangement and combination of the various parts of my lens molding apparatus, whereby the objects above contemplated are attained as hereinafter more fully set forth, pointed out in my claims and illustrated in detail on the accompanying drawing, wherein:

FIG. 1 is a plan view of a lens molding apparatus embodying my invention and showing various steps in the loading and unloading thereof;

FIG. 2 is a sectional view through a female mold and a holder therefor showing a plastic lens blank in position and constitutes a first step in the loading of a mold assembly;

FIG. 3 is a similar view showing the male molding member in position and constitutes a second loading step;

FIG. 4 is a similar view showing an upper holder and a second female mold as well as a second plastic lens blank in position and ready for the application of heat and pressure, and constitutes a third loading step;

FIG. 5 is a sectional view similar to FIG. 4 showing the final position of the parts after the proper application of heat pressure;

FIG. 6 is a sectional view on the line 6—6 of FIG. 1;

FIG. 7 is an enlarged sectional view of a portion of FIG. 5 showing the relationship of parts at the completion of the lens forming operation, a positive lens being shown;

FIG. 8 is a view of a portion of FIG. 7 showing the surplus on the lens blank being trimmed from the completed lens; and FIG. 9 is a view similar to FIG. 7 showing the formation of a negative lens by the proper selection of male and female molds.

On the accompanying drawings, and referring to FIGS. 2, 3, 4 and 5, I have used the reference numeral 10 to indicate a mold holder and 12 a female mold to be held in a bore 15 thereof. A male mold 14 is provided in the form of a sphere. I have found ball bearings suitable after their surfaces have been highly polished. At 16 I show a plastic lens blank which may be a square of methyl methacrylate of the size shown in FIG. 1 in relation to the diameter of the holder 10 and in FIG. 5 this has become a lens 16a with surplus around the edge indicated at 18 as will hereinafter be more fully described.

For receiving the holders 10, the molds 12 and 14 and the lens blanks 16, I provide a body member 20 (FIGS. 1 and 6) suitably supported as on a plate 22. The supporting plate 22 may be in turn supported by suitable frame members such as angle irons shown at 24 in FIG. 6 and these, of course, are suitably supported on a work bench or the like (not shown).

The body member 20 has two rows of spaced bores 26 therein and the body member 20 and the supporting plate 22 are perforated as at 28 and 28a respectively as shown in FIG. 6 to receive a stem 30 terminating in a head 32 located in each bore 26. The elements 30—32 constitute mold elevating means as shown in the left half of FIG. 6 and as will hereinafter be described.

Each mold holder 10 is perforated as at 34 to receive at times a shouldered pressure pin 36 as shown in FIGS. 4 and 5 and 6 with which a lever 38 is adapted to coact. The lever 38 is pivoted on a pivot rod 42 and has a weight 40 thereon, the pivot rod being supported by ears 44 extending upwardly from the body member 20. The pivot rod may be secured in position as by set screws 43 as shown in FIG. 1.

The body member 20 (formed of suitable heat conducting metal such as aluminum) is heated as by heating elements 46 and 46a of electric "strip heater" type, and these are held against the left and right sides of the body member 20 as viewed in FIG. 1 and in slots 21 of the body member 20 adjacent the ears 44 by insulation 48 and 48a respectively. A casing 50 extends around the outer heating elements 46 (as distinguished from inner 46a).

Cooling coils 52 are imbedded in the body member 20 and the flow of cooling fluid such as tap water is controlled thereto from supply lines 56 by valves 54, the outlet ends 58 of the cooling coils 52 extending to a drain or the like.

*Practical operation*

In the operation of my apparatus, one of the bores 26 is loaded by placing an appropriate female mold 12 in a holder 10 as in FIG. 2 and laying thereon a plastic lens blank 16. The assembly of FIG. 2 is then placed in one of the bores 26 of the body member 20 as at the left side of FIG. 6 by the operator reaching his finger under the plate 22 and elevating the mold holder elevator 30—32. The elevator may then be lowered somewhat whereupon the ball 14 is positioned as in FIG. 3 and within the bore 26. Then another mold holder 10 (the upper one in FIG. 4) with a mold 12 and a blank 16 on its lower surface is placed on the ball 14 and the assembly further lowered into the bore 26 until it reaches the bottom thereof.

The shouldered pressure pin 36 is inserted as in FIG. 4 so as to take the thrust from the lever 38. Assuming the assembly of FIG. 4 now being in the lower left bore 26 of FIG. 1, the lower lever 38 is swung from the right-hand (dotted) position to a similar position on the left for applying pressure to the assembly of mold holders, molds and lens blanks. The weight alone will depress the parts somewhat from the position of FIG. 4, and thereupon the heating elements 46—46a may be energized for heating the body member 20.

After a suitable period of time at a suitable temperature produced by the heating elements 46 and 46a, the two lenses of FIG. 4 will be formed as in FIGS. 5 and 7 whereupon the left half of the body member 20 may be cooled by passing water through its tube 52 and the lenses removed when cooled sufficiently to permit handling.

It will be noted that the surplus 18 in FIGS. 7 and 9 is divided from the lens 16a or 16b by a neck 19. This neck is desirably quite narrow so that it can be easily cut through by means of a razor blade 23 as in FIG. 8 by passing the razor blade around the lens in contact with the top of the holder 10.

Having described my apparatus and its operation in general, I will now refer to specific considerations. Corneal contact lenses molded by my apparatus have three characteristics in general.

(1) A base curve (concave surface) indicated by the radii B in FIGS. 7, 8 and 9;

(2) A power curve indicated by the radii P in FIGS. 7, 8 and 9; and (3) The lens may be positive (plus dioptric power), negative (minus dioptric power) or plano (zero dioptric power). In FIGS. 7 and 8 a positive lens is illustrated and in FIG. 9 a negative lens.

The base and power curves vary considerably for corneas of different radii and the many different required dioptric powers for individual patients. Therefore, it is necessary to provide a series of female molds 12 and likewise a series of male molds 14 over a considerable range such as 5.0 mm. to 9.0 mm. The series must be in small increments or steps such as between $\frac{1}{10}$ and $\frac{1}{100}$ of a millimeter, and obviously therefore quite a number of molds is necessary for the full range. The holders 10, however, can be of one standard size with a standard bore 15 and a standard depth of such bore. The molds 12 can then be made with a series in each size of different height so as to vary the distance D shown in FIG. 9 (or the holders 10 may be formed in a series in which the bores 15 are of different depths). This is necessary in order to have different thicknesses of lens edge such as the relatively thin edge of the positive lens in FIG. 7 or the relatively thick edge of the negative lens in FIG. 9 which, of course, varies with the power, positive or negative. This is an important reason why I provide the holders 10 for the female molds 12 instead of making the parts 10 and 12 all in one piece.

Essentially my apparatus comprises a body member 20 with a single bore 26 therein and a single lever 38 and weight 40 from which lenses of various base curves and powers may be produced when a series of interchangeable upper molds 12 and 14 are provided. The lenses will all be of the same diameter but this is no problem inasmuch as the molds can be designed for the maximum diameter and the lenses readily reduced in diameter by grinding their edge either on an ordinary emery wheel or in the socket of a cone type emery wheel. Thereafter, the edge of the lens is the only portion thereof that needs treatment to provide a finished lens as the surfaces B and P are smooth and highly polished providing the concave surfaces of the molds 12 and the surfaces of the balls 14 are likewise smooth and highly polished. Then the lens, either at the diameter it comes from the mold after cutoff by the razor blade 23 or at its reduced diameter, is rounded and smoothened to provide a finished lens that is ready to be worn by the patient requiring the lens to correct his vision.

From a production standpoint, it is desirable to be able to mold as many lenses as possible within a cycle of operation, and accordingly a plurality of the bores 26 may be provided in the body member 20. Ten are shown in FIG. 1 but under normal conditions as many as 14 to 20 have been found feasible. Desirably, these bores are arranged in two rows with the pivot rod 42 between them so that the weighted arms 38 may be swung from one side to the other as shown in FIG. 1 (four of them to the right and one to the left).

The bores 26 are shown loaded to various degrees in FIG. 1, the upper left bore (in the left vertical column) having a lower holder 10 and mold member 12 therein; the one below it having a blank 16 placed thereon as in FIG. 2; the next one having the mold 14 added as in FIG. 3; the next one having the pressure pin 36 added as in FIG. 4; the last one (at the bottom) the same as the previous one except that the lever 38 has been swung from the dotted position and into position over the pressure pin. In the right-hand vertical column the upper four bores 26 are shown filled with molding assemblies of FIG. 4 and with the levers 38 over them, whereas the bottom bore 26 is empty and therefore the head 32 of the mold holder elevator is in evidence.

In the operation of the apparatus as shown in FIG. 1 the left-hand column may be prepared by filling the bores 26 with the assemblies shown in FIG. 4 whereupon all the weighted levers 38 which were swung to the right are swung to the left for applying pressure and the left-hand two heating elements 46 and 46a are then turned on. While the heat is accumulating to the desired temperature and for the desired time period, the right-hand column of bores are likewise filled with the assemblies, and at the proper time the heat is turned off the left-hand heating elements and the valve 54 for this section opened for cooling the molds. At the proper time the weighted levers 38 are then all swung to the right and a similar heating and cooling cycle performed for the right-hand section of the apparatus while the left-hand section is unloaded and reloaded. Thus the apparatus is designed for continuous operation cycle after cycle without interruption and the timing in relation to the number of units is such as to provide for greatest efficiency in production.

Several factors, of course, have to be determined such as the required heat and time for the particular plastic being used to form the lenses, the distance D in FIG. 9 for various combinations of base curves and power curves to result in the relatively narrow neck at 19 for ease of trimming as in FIG. 8, the leverage afforded by 38 in relation to the weight 40 and the like. Once these factors are established, however, the number of units possible of working by the operator may be determined and maximum efficiency of the operator's time in the production of lenses results.

Some changes may be made in the construction and arrangement of the parts of my lens molding apparatus without departing from the real spirit and purpose of my invention, and it is my intention to cover by my claims any modified forms of structure or use of mechanical equivalents which may reasonably be included within their scope.

I claim as my invention:

1. Lens molding apparatus comprising a body member having a mold holder receiving bore therein, a pair of mold holders receivable in said bore, each of said mold holders having a mold-receiving bore, a female mold interchangeably received in each of said mold-receiving bores, a male mold comprising a ball located in said mold holder receiving bore between the two of said holders and the two of said female molds therein, and adapted for forming a pair of lenses from sheet-like lens blanks located between said male mold and said female molds, means for heating said body member, a lever for applying pressure to the assembly of holders, female molds, male mold and lens blanks in said mold-receiving bore, a weight on said lever providing such pressure, and means for cooling said body member after a pair of lenses have been molded from said lens blanks by heat and pressure.

2. Lens molding apparatus comprising a body member having a mold-receiving bore therein, a pair of female molds received in said mold-receiving bore, a male mold comprising a ball located in said mold-receiving bore between the two of said female molds therein, and adapted for forming a pair of lenses from lens blanks located between said male mold and said female molds, and means for heating said body member and applying pressure to the assembly of female molds, male mold and lens blanks in said mold-receiving bore.

3. Lens molding apparatus comprising a body member having a mold-receiving bore therein, a pair of female molds interchangeably received in said mold-receiving bore, an interchangeable male mold located in said mold-receiving bore between the two of said female molds therein, and adapted for forming a pair of lenses from sheet-like lens blanks located between said male mold and said female molds, means for heating said body member, means for applying pressure to the assembly of female molds, male mold and lens blanks in said mold-receiving bore, and means for cooling said body member after the formation of said lens blanks into lenses.

4. Molding apparatus for contact lenses comprising a body member having a mold-receiving bore therein, a pair of female molds for reception in said bore, a male mold comprising a ball for positioning between said female molds, each of said female molds comprising a cylinder having a concave surface, said molds being interchangeable with respect to said body member and being adapted to receive a sheet plastic lens blank between the ball and each female mold, and means for applying heat and pressure to the foregoing elements for forming from said sheet plastic lens blanks, concavo-convex lenses having predetermined base curves and power curves determined by the selection of said ball molds and female molds respectively.

5. Molding apparatus for contact lenses comprising a body member, a pair of concave female molds for reception therein, a ball-shaped male mold for positioning between said female molds with a sheet plastic blank between the ball and each female mold, and means for applying heat and pressure to the foregoing elements.

6. Lens molding apparatus of the character disclosed comprising a body member having two rows of mold holder receiving bores therein, an assembly for each bore comprising upper and lower mold holders, each of said mold holders having a mold receiving bore, a female mold in each of said mold receiving bores and having concavities facing each other, a male mold comprising a ball between said mold holders, said molds being adapted for the positioning of two lens blanks of sheet plastic material between the male mold in each mold holder receiving bore and the female molds therein, means for heating said body member, a pivot rod between said two rows of bores, levers pivoted thereon to swing over either row and provided with weights for applying pressure to the assemblies in either row of mold holder-receiving bores, and means for individually cooling separate portions of said body member having said two rows of bores therein.

7. Lens molding apparatus comprising a body member having two rows of mold-receiving bores therein, an assembly for each bore comprising upper and lower female molds in each of said mold-receiving bores and having concave surfaces facing each other, a male mold between said female molds and having convex surfaces presented to said female molds, the three molds in each bore being adapted for the positioning of two lens blanks between the male mold and the two female molds therein, means for heating said body member, a pivot rod between said two rows of bores, levers pivoted thereon to swing over either row of bores and provided with weights for applying pressure to the molds and lens blanks in either row of bores as required, and means for cooling said body member.

8. Lens molding apparatus comprising a body member having two rows of mold-receiving bores therein, an assembly for each bore comprising upper and lower female molds in each of said mold-receiving bores and having concave surfaces facing each other, a male mold comprising a ball between said female molds, the three molds in each bore being adapted for the positioning of two lens blanks between the male mold and the two female molds therein, means for heating said body member, and means for applying pressure to the molds and lens blanks in either row of bores as desired.

9. Lens molding apparatus comprising a body member having a mold holder receiving bore therein, a pair of mold holders receivable in said bore, each of said mold holders having a mold-receiving bore, a concave-surfaced female mold interchangeably received in each of said mold-receiving bores, a convexed surface male mold located in said mold holder receiving bore between the two of said mold holders and the two of said female molds therein, and adapted for forming a pair of lenses from sheet-like lens blanks located between said male mold and said female molds, means for heating said body member, and means for applying pressure to the assembly of holders, female molds, male mold and lens blanks in said mold-receiving bore.

10. Lens molding apparatus comprising a body member having a mold-receiving bore therein, a pair of concave-surfaced female molds received in said mold-receiving bore, a convexed-surface male mold located in said mold-receiving bore between the two of said female molds therein, and adapted for forming a pair of lenses from lens blanks located between said male mold and said female molds, and means for heating said body member and applying pressure to the assembly of female molds, male mold and lens blanks in said mold-receiving bore.

References Cited in the file of this patent
UNITED STATES PATENTS

| | | |
|---|---|---|
| 673,847 | Ruckl | May 7, 1901 |
| 2,304,663 | Smith et al. | Dec. 8, 1942 |